United States Patent
Pawar et al.

(10) Patent No.: US 9,706,583 B1
(45) Date of Patent: Jul. 11, 2017

(54) METHOD AND SYSTEM FOR CONTROLLING OPERATION OF A USER EQUIPMENT DEVICE BASED ON EXTENT TO WHICH THE USER EQUIPMENT DEVICE PROVIDES CONNECTIVITY FOR AT LEAST ONE OTHER DEVICE

(71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/259,324

(22) Filed: Sep. 8, 2016

(51) Int. Cl.
| | |
|---|---|
| *H04B 1/38* | (2015.01) |
| *H04M 1/00* | (2006.01) |
| *H04W 76/02* | (2009.01) |
| *H04L 12/26* | (2006.01) |
| *H04W 8/00* | (2009.01) |
| *H04W 88/06* | (2009.01) |
| *H04W 88/04* | (2009.01) |
| *H04W 88/08* | (2009.01) |
| *H04W 88/14* | (2009.01) |
| *H04W 92/10* | (2009.01) |

(52) U.S. Cl.
CPC ......... *H04W 76/02* (2013.01); *H04L 43/0811* (2013.01); *H04W 8/005* (2013.01); *H04W 88/04* (2013.01); *H04W 88/06* (2013.01); *H04W 88/08* (2013.01); *H04W 88/14* (2013.01); *H04W 92/10* (2013.01)

(58) Field of Classification Search
CPC ..... H04W 76/02; H04W 8/005; H04W 88/04; H04W 88/06; H04W 88/08; H04W 88/14; H04W 92/10; H04L 43/0811
See application file for complete search history.

(56) References Cited

U.S. PATENT DOCUMENTS

| | | | | |
|---|---|---|---|---|
| 2013/0260758 | A1* | 10/2013 | Zhao | ..................... H04W 36/14 455/436 |
| 2015/0092708 | A1* | 4/2015 | Su | ....................... H04W 76/026 370/329 |
| 2015/0095955 | A1* | 4/2015 | Singh | ............... H04N 21/44004 725/62 |

\* cited by examiner

*Primary Examiner* — Nguyen Vo

(57) ABSTRACT

Disclosed herein is a method and corresponding system for controlling how a user equipment device (UE) served by a base station of a first network is concurrently served by a second network, where the first network is interconnected with the second network. In an example method, if the UE determines that the UE provides connectivity between at least one other device and the base station, the UE then causes itself to be served by the second network in a first mode in which the UE is registered with the second network via the first network. Whereas, if the UE determines that the UE does not provide such connectivity, the UE then instead causes itself to be served by the second network in a second mode in which the UE is registered with the second network directly via the second network rather than via the first network.

20 Claims, 3 Drawing Sheets

METHOD AND SYSTEM FOR CONTROLLING OPERATION OF A USER EQUIPMENT DEVICE BASED ON EXTENT TO WHICH THE USER EQUIPMENT DEVICE PROVIDES CONNECTIVITY FOR AT LEAST ONE OTHER DEVICE

BACKGROUND

In wireless communication systems, wireless service providers may operate radio access networks (RANs), each RAN including a number of base stations radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

Further, a RAN may operate in accordance with a particular air interface protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), Global System for Mobile Communications (GSM), IEEE 802.11 (WiFi), BLUETOOTH, and others. Each protocol may define its own procedures for registration of UEs, initiation of communications, handover between base station coverage areas, and other functions.

In accordance with the air interface protocol, each base station may provide wireless service to UEs on one or more carrier frequencies, or "carriers", each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance. A given base station could be arranged to serve a UE on a single such carrier at a time or, with carrier aggregation service or the like, on multiple carriers at a time.

Each carrier may also define various logical channels to facilitate communication between the base station and one or more served UEs. For instance, on the downlink, a carrier may define a reference channel on which the base station broadcasts a reference signal useable by UEs to detect and evaluate coverage, various other downlink control channels to carry control signaling (such as resource-scheduling directives) to UEs, and one or more shared or traffic channels for carrying bearer data (e.g., user or application level data) to UEs. And on the uplink, a carrier may define one or more uplink control channels to carry control signaling (such as resource scheduling requests) from UEs, and one or more shared or traffic channels for carrying bearer data from UEs. In practice, the shared or traffic channels may define particular physical resources for carrying data between the base station and UEs.

When a UE initially enters into coverage of a RAN (e.g., powers on or moves into coverage of the RAN), the UE may detect a reference signal and read system information broadcast from a base station of the RAN and may engage in a process to register itself with the base station and generally by the RAN. For instance, the UE may transmit an attach or registration message on an uplink control channel to the base station, and the base station and/or supporting infrastructure may then responsively authenticate and authorize the UE for service, establish a record indicating where in the RAN the UE is operating, establish local profile or context records for the UE, and provide an attach accept or registration response message to the UE. Thereafter, the UE may then be served by the RAN in an idle mode or a connected/active mode.

OVERVIEW

In some areas, service providers may operate a hybrid wireless communication system that includes multiple separate but interconnected RANs that each provide air interface coverage according to a different air interface protocol. For instance, such a system may include a first RAN (e.g., an LTE RAN) that provides high speed data communications and a second RAN (e.g., a CDMA RAN) that provides traditional telephony service. In such a system, a UE may connect with and be served by the first RAN by default, to facilitate engaging in data communication, and the UE may then at some point transition to connect with and be served by the second RAN when necessary to engage in a voice call, all while at the same time continuing to be served by the first RAN. To facilitate this, a UE that registers with and is served by the first RAN may also separately register with the second RAN so that the UE can place and receive calls as necessary.

A UE may have two mutually exclusive modes of operation for doing this in practice. In the first of these two modes, after the UE registers with a base station of the first RAN, the UE may then engage in pre-registration signaling with the second RAN via the first RAN (i.e., over the first RAN's air interface, via the base station and the first RAN's core network) in order to register for service of the second RAN. Thereafter, while in the first mode, the UE may then engage in call setup signaling with the second RAN, via the first RAN, to receive/place a voice call. For instance, when the second RAN pages the UE for a call to be served by the second RAN, the page passes via the first RAN for receipt by the UE such that the UE receives the page over the first RAN's air interface. In this first mode, the UE does not tune away from the first RAN to the second RAN to check for pages over the second RAN's air interface.

In the second of these two modes, on the other hand, after the UE registers with a base station of the first RAN, the UE may register with the second RAN directly via the second RAN (i.e., over the second RAN's air interface) rather than via the first RAN, and may be set to engage in call setup signaling with the second RAN directly via the second RAN rather than via the first RAN. Thereafter, while in the second mode, the UE may then operate in the first RAN for data service, but may (i) periodically tune away from coverage of the first RAN to coverage of the second RAN in order to search for page messages from the second RAN (i.e., for a UE-terminated call), or (ii) move over to the second RAN to originate a voice call. For the period of time during which the UE is tuned away (e.g., five seconds), ongoing data communications between the UE and the base station may be interrupted.

Unfortunately, such an interruption of communications during second mode operation can be an issue when the UE is a type of device that is configured to provide at least one other device with connectivity to the base station. For such a UE, an interruption of communications over the UE's air interface with the base station may in turn impact the communication of each other device that is connected with the base station via the UE. Consequently, it would be beneficial for a UE of that type to avoid operation in the second mode, and to instead operate in the first mode in which the UE does not tune away and interrupt communications in the manner discussed above.

The present disclosure provides for dynamically controlling a UE's mode of operation in a hybrid system based on a consideration of the extent to which the UE provides connectivity between at least one other device and the UE's serving base station. As such, the disclosure draws a distinction between UEs operating as endpoint (e.g., end-user) devices that are not configured to provide at least one other device with connectivity to the UE's serving base station, and UEs operating as relay-UEs, hotspot-UEs, or the like, that are configured to provide at least one other device with connectivity to the UE's serving base station.

In accordance with the disclosure, a UE served by the first RAN, the UE's serving base station, and/or another network entity may be arranged to determine the extent to which the UE provides connectivity between at least one other device and the UE's serving base station, and to then use that determination as a basis for deciding whether to cause the UE to operate in the first mode or rather to cause the UE to operate in the second mode. For instance, if the UE or base station determines that the UE provides connectivity between at least one other device and the UE's serving base station, the UE or base station will responsively decide to cause the UE to operate in the first mode, whereas if the UE or base station determines that the UE does not provide such connectivity, the UE or base station will responsively decide to cause the UE to operate in the second mode.

The extent could be a question of whether or not the UE is a type of UE that is configured to provide such connectivity, regardless of whether the UE is currently providing such connectivity. For instance, the extent could be a question of whether the UE is just an endpoint device, or is rather configured or connected to function as a relay, hotspot, or the like. Such a UE can proactively set itself to operate in the first mode rather than in the second mode, to prepare for a scenario in which the UE may eventually provide connectivity between at least one other device and the base station.

Additionally or alternatively, the extent at issue in this process could be a question of whether the UE is currently providing such connectivity for at least one other device. Further, the extent could more specifically be a question of how many other devices the UE is currently providing with such connectivity. For instance, if the UE is currently providing connectivity between at least two other devices and the base station, then it may be desirable for the UE to operate in the first mode rather than in the second mode, as the occurrence of second mode interruptions in communications may be acceptable between the base station and one such device, but may be unacceptable between the base station and two or more such devices.

As noted above, this process could be implemented by the UE, by the base station, and/or by another network entity, such as a base station controller. For example, the UE, the base station, or the controller could have profile or service information for the UE indicating the extent to which the UE is configured to provide connectivity between at least one other device and the base station, and the UE, base station, or controller could use that information as a basis for causing the UE to operate in either the first mode or the second mode. If the process is applied by the UE, then the UE could set itself to operate in either the first mode or the second mode. Whereas, if the process is applied by the base station, then the base station could transmit to the UE a control signal that directs the UE to operate in either the first mode or the second mode. Or, if the process is applied by the controller, then the controller could instruct the base station to transmit such a control signal to the UE. Other arrangements are possible as well.

Accordingly, in one respect, disclosed is a method for controlling operation of a UE in a communication system in which a first RAN provides a first air interface and a second RAN provides a second air interface, and in which the first RAN is interconnected with the second RAN. In particular, disclosed is a method for controlling how a UE served by a base station of the first RAN is concurrently served by the second RAN. The method involves making a determination of whether the UE provides connectivity between at least one other device and the base station. Further, the method involves, if the determination is that the UE provides connectivity between at least one other device and the base station, then, responsive to the determination being that the UE provides connectivity between at least one other device and the base station, causing the UE to be served by the second RAN in a first mode in which, while the UE is served by the base station via the first air interface, (i) the UE is registered with the second RAN via the first RAN so that when the second RAN pages the UE for a call to be served by the second RAN, the page passes via the first RAN and the UE receives the page via the first air interface, and (ii) the UE does not tune away from the first RAN to the second RAN to check for pages via the second air interface.

Still further, the method involves, if the determination is that the UE does not provide connectivity between at least one other device and the base station, then, responsive to the determination being that that the UE does not provide connectivity between at least one other device and the base station, causing the UE to be served by the second RAN in a second mode rather than in the first mode, where in the second mode, while the UE is served by the base station via the first air interface, (i) the UE is registered directly with the second RAN so that when the second RAN pages the UE for a call to be served by the second RAN, the UE receives the page via the second air interface, and (ii) the UE periodically tunes away from the first RAN to the second RAN to check for pages via the second air interface.

In another respect, disclosed is a UE with dynamic operating mode, the UE comprising a first radio, a second radio, and a control unit. The first radio is configured for the UE to be served by a first RAN, where the first RAN provides a first air interface, and where the first RAN is interconnected with a second RAN. The second radio is configured for the UE to be served by the second RAN, where the second RAN provides a second air interface. And the control unit is configured for controlling how the UE, when served by a base station of the first RAN, is concurrently served by the second RAN. This controlling of the UE may involve operations in accordance with the method discussed above.

In still another respect, disclosed is a method for controlling operation of a UE in a communication system like that noted above. In particular, disclosed is a method for controlling how a UE served by a base station of the first RAN is concurrently served by the second RAN, where the UE has two mutually exclusive modes of operation in which the UE can be served by the second RAN while the UE is concurrently being served by the first RAN. The two modes include (i) a first mode of operation in which the UE is registered with the second RAN via the first RAN and is thus set to receive pages from the second RAN via the first RAN and the first air interface, and the UE does not tune away from the first RAN to the second RAN to check for pages via the second air interface and (ii) a second mode of operation in which the UE is registered directly with the second RAN and is thus set to receive pages from the second RAN via the second air interface, and the UE tunes away periodically from the first RAN to the second RAN to check for pages via the second air interface.

The method may involve the UE making a determination of whether the UE provides connectivity between at least one other device and the base station. Further, the method may involve, based on the determination of whether the UE provides connectivity between at least one other device and the base station, the UE making a decision whether to operate in the first mode or instead to operate in the second mode. The method may then involve the UE operating in accordance with the decision.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described by way of example in the context of a hybrid LTE/CDMA communication system. However, it will be understood that the principles of the disclosure can extend to apply in other scenarios as well, such as with respect to other air interface protocols. Further, even within the context of a system that supports both LTE service and CDMA service, numerous variations form the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
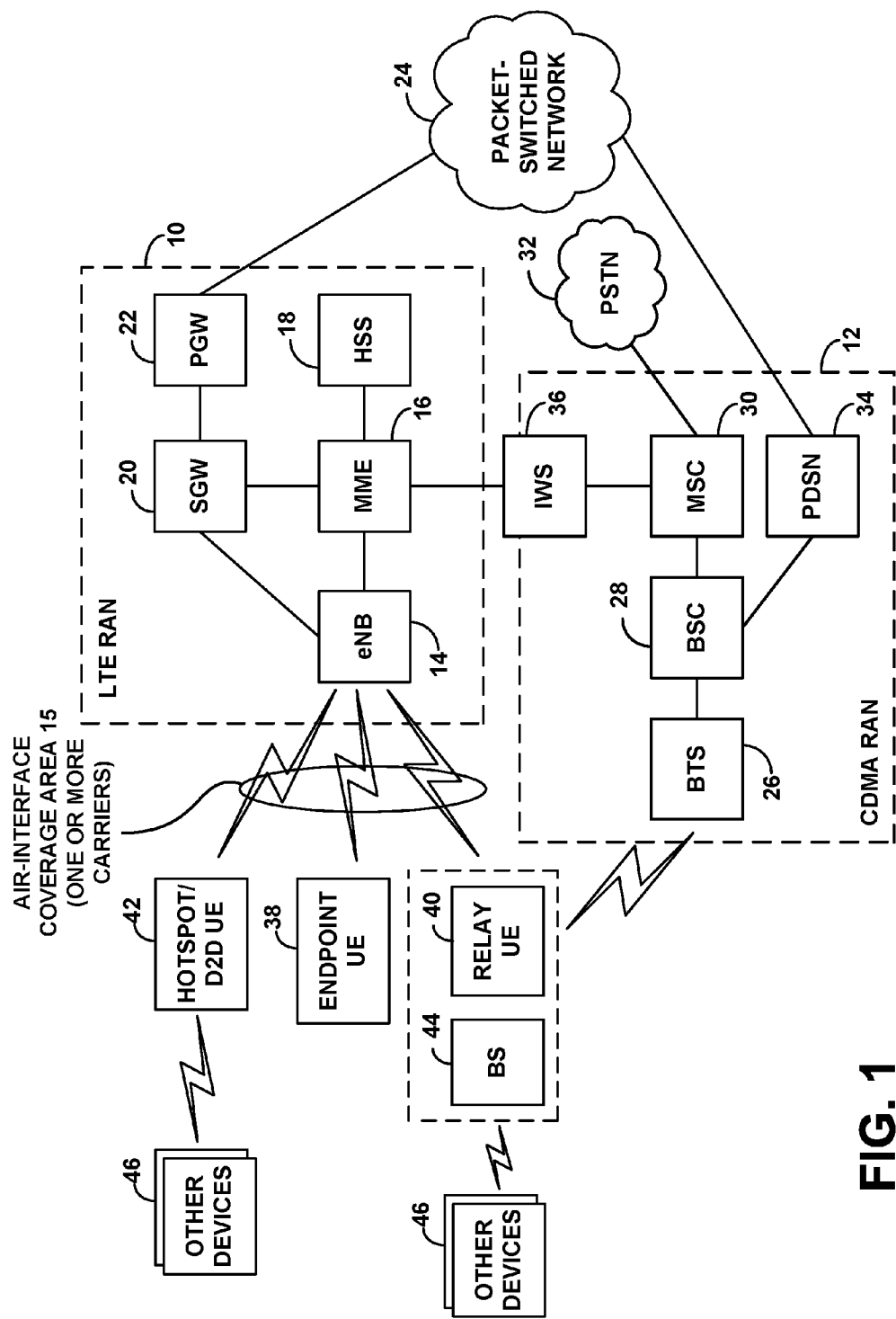
FIG. 1 is a simplified block diagram of an example wireless communication system in which aspects of the present disclosure can be implemented.

FIG. 1 is a simplified block diagram of an example wireless communication system in which the present method and system can be implemented. In particular, the example system includes an LTE RAN 10 and a CDMA RAN 12. In the example system, the LTE RAN functions primarily to serve UEs with wireless packet data communication service. Whereas the CDMA RAN primarily serves UEs with wireless circuit-switched voice call service but may also provide packet-data communication service and other types of service. Both of these RANs may be operated by a common wireless service provider or by different wireless service providers.

The LTE RAN 10 in the example system is shown including a representative LTE base station 14 known as an eNodeB (or "eNB"), which includes an antenna structure and associated equipment for providing an LTE air interface coverage area 15 in which to serve UEs. The eNodeB 14 then has a communication interface with an example MME 16, where the MME functions as a signaling controller for the LTE RAN 10 and has a communication interface with a home subscriber server (HSS) 18. Further, eNodeB 14 has a communication interface with a serving gateway (SGW) 20, which in turn has a communication interface with a packet-data-network gateway (PGW) 22, where the PGW provides connectivity with a packet-switched transport network 24 such as the Internet, and the MME has a communication interface with the SGW 20 as well. In practice, the illustrated components of the LTE RAN 10 may sit as nodes on a private packet-switched network owned by an operator of the LTE RAN 10, and thus the various communication interfaces may be logical interfaces within that network.

The CDMA RAN 12 is shown including a representative CDMA base station 26 known as a base transceiver station (BTS), which includes an antenna structure and associated equipment for providing CDMA coverage in which UEs can be served by the BTS and thus by the CDMA RAN. The BTS is then shown in communication with a base station controller (BSC) 28, which is in turn shown in communication with a mobile switching center (MSC) 30 that provides connectivity with the PSTN 32 and in communication with a packet data serving node (PDSN) 34 that provides connectivity with the packet-switched network 24. Other BTSs (not shown) may exist in this hybrid system as well, each providing CDMA coverage.

Further shown in FIG. 1 is an interworking server (IWS) 36, which provides connectivity between the LTE RAN and the CDMA RAN to facilitate exchange of signaling between the RANs, such as the pre-registration signaling and the call setup signaling discussed above. The IWS may be provided as an element of either one of the RANs or as an element separate from but connected to each RAN, and, as shown, has a communication interface (e.g., an S102 interface) with the MME of the LTE RAN and a communication interface with the MSC of the CDMA RAN.

In addition, FIG. 1 illustrates three example UEs 38, 40, 42 being served by the eNodeB 14 over air interface 15 (e.g., within a particular coverage area of eNodeB 14). UE 38 is typical end-user UE such as a cell phone or wirelessly-equipped computer, tablet, or other device that does not provide connectivity for at least one other device. UEs 40 and 42, on the other hand, are UEs that provide connectivity for at least one other device. In particular, UE 40 is connected, configured, or otherwise arranged as a "relay-UE" coupled or integrated with a small cell base station (also referred to as a "mini-macro base station") 44 or the like that is in turn configured (similar to eNodeB 14) to serve at least one other device 46. As such, UE 40 functions as an intermediary between eNodeB 14 and any devices served by small cell base station 44, with the air interface connection between UE 40 and base station 12 functioning as a wireless backhaul link for the small cell base station 34. And UE 42 is configured as a hotspot UE (also known as a device-to-device (D2D) UE) such as a cell phone having a personal-hotspot feature, to function as an intermediary between eNodeB 14 and at least one other device 46, similar to the relay-UE. For example, a hotspot UE can be configured to turn on its personal-hotspot feature by way of a software switch so that the UE then begins to operate in a hotspot mode in which it is set to (i) connect via WiFi or another connection with one or more endpoint devices, (ii) engage in communication with a base station (e.g., eNodeB 14) via a cellular air interface, and (iii) bridge those communications.

In practice, when any such UE (end-user, relay, or hotspot) enters into coverage of an LTE base station such as eNodeB 14, the UE may engage in a process to attach with, hand over to, or otherwise associate with the eNodeB, which may result in establishment of a radio-link-layer connection (e.g., radio resource control (RRC) connection) over the air interface between the UE and the eNodeB so that the eNodeB can then provide the UE with LTE service. For instance, in this attach process, the UE may transmit an attach request to the eNodeB, which the eNodeB may forward to the MME, and the MME may then engage in signaling to control setup of one or more bearers for carrying data for the UE between the PGW and the eNodeB. Further, in this attach process, the UE may convey to the eNodeB information about the UE's profile and configuration, and the MME may also receive such UE information from the HSS and convey that information to the eNodeB, and the eNodeB may store this information in a local context record for the UE.

Additionally, in practice, each such UE may store profile, configuration, or status data that specifies the extent to which the UE provides connectivity for at least one other device. For instance, the UE could store data that indicates whether the UE is the type of device that provides such connectivity. By way of example, the UE could store an indication of whether the UE is configured, connected, or otherwise arranged to operate as a relay-UE for a small cell base station, or is configured to operate as a hotspot UE as discussed above. Or rather, as another example, the UE could store an indication that the UE is just an endpoint (e.g., end-user) device. Further, if the UE is the type of device that provides such connectivity, the UE could store data that indicates how many other devices the UE is currently providing with such connectivity.

This data could be established and stored in each UE in various ways and at various times. For instance, at the time of manufacture, distribution, or deployment, a UE could be provisioned with data that specifies whether the UE is the type of device that will provide connectivity for at least one other device, such as whether the UE will function as a relay-UE or hotspot UE or will rather function as an endpoint UE. Further, while in use, the UE could be provisioned or re-provisioned with such data if the profile, configuration, or status of the UE changes, such as if an endpoint UE gets connected and set to function as a relay-UE or gets provisioned with hotspot functionality.

By way of example, an endpoint UE could be provisioned with data indicating that the UE does not provide connectivity for at least one other device (or, just as well, could lack data that indicates the UE provides connectivity for at least one other device). Further, a relay-UE or hotspot UE could be provisioned with data indicating that the UE is configured to provide connectivity for at least one other device, such as a general indication that the UE provides such connectivity, or a specific indication that the UE is currently providing such connectivity. For instance, when a relay-UE is configured to provide such connectivity, the relay-UE may set a context record parameter or flag once the UE has established local area network (LAN) communication or the like with a small cell base station and/or once the UE acquires a bearer specifically for serving a small cell base station. And a hotspot UE may store, as a context record parameter or flag, an indication of whether the hotspot UE includes a personal-hotspot feature for providing hotspot service, or an indication of whether the personal-hotspot feature is currently turned on or off.

Still further, a UE that provides connectivity for at least one other device could be provisioned with data that indicates the quantity of such devices for which the UE is currently providing connectivity. For instance, a relay-UE could receive from its associated small cell base station an indication of the quantity of devices that are currently connected with or otherwise served by the small cell base station, including updates as the quantity changes, and could store that quantity as the quantity of devices for which the relay-UE is currently providing connectivity. And a hotspot UE could likewise determine and store an indication of how many other devices the hotspot UE is currently providing with connectivity. Variations and other examples are possible as well.

In addition, eNodeB 14, MME 16, or another LTE entity may also store such profile, configuration, or status data respectively for each UE that is attached with the eNodeB. The eNodeB could receive some of this data from the UE or from the MME, perhaps when the UE initially attaches with the eNodeB, and the eNodeB could store the data in a context record for the UE as a context record parameter, profile parameter, or the like that is keyed to a UE identifier such as an International Mobile Subscriber Identity (IMSI) or a public land mobile network (PLMN) ID. Further, as the UE's configuration or status changes, such as if the UE transitions between being an endpoint UE to being a UE that provides connectivity for at least one other device, or when the quantity of devices for which the UE provides connectivity changes, the eNodeB could receive updated data indicating the change.

Referring back to FIG. 1, UE 40 is shown to be located within coverage of both the LTE RAN and the CDMA RAN. In particular, UE 40 is shown to be located within coverage of both eNodeB 14 and BTS 26. And although not explicitly shown in FIG. 1, it should be assumed for the purposes of the following description that UE 38 and UE 42 are also each located within coverage of both eNodeB 14 and BTS 26. Further, UEs 38, 40, and 42 are hybrid telephony devices equipped to support both LTE service and CDMA service (e.g., having a radio and associated components for selectively engaging in LTE service or CDMA service). In practice, a UE equipped in this manner may be configured to prefer LTE service by default. Thus, when the UE is in coverage of both the LTE RAN and the CDMA RAN as shown, the UE may register to be served by an LTE base station as discussed above. For instance, UEs 38, 40, and 42 may each register to be served by eNodeB 14.

In line with the discussion above, when the UE is served by the LTE base station, the UE may also operate in one of two mutually exclusive modes of operation, each of which allow the UE to engage in voice calls served by the CDMA RAN while being served concurrently by the LTE base station. In the context of a hybrid LTE/CDMA system, a first mode of the two mutually exclusive modes may be referred to as "circuit-switched fallback" (CSFB) mode and the second mode of the two mutually exclusive modes may be referred to as "single-radio-LTE" (SRLTE) mode. It should be noted that, while CSFB mode and SRLTE mode are discussed herein as examples of the first mode and the second mode, other examples of the first mode and the second mode are also possible. The UE may be arranged by default to operate in either of the two modes.

In CSFB mode, the UE may engage in pre-registration signaling with the CDMA RAN via the LTE base station and the LTE RAN's core network in order to register for CSFB service of the CDMA RAN. To facilitate this in practice, the UE may transmit to its serving LTE base station a CDMA pre-registration request message, and that message may pass through the LTE RAN to the CDMA RAN (via IWS 36), leading to pre-registration of the UE with the CDMA RAN.

After the UE in CSFB mode is registered with the LTE RAN and the CDMA RAN, CDMA call setup signaling can pass between the UE and the CDMA RAN via the LTE RAN (i.e., via the LTE base station and the LTE RAN's core network) and via the IWS 36. For instance, when the CDMA RAN has a call to connect to the UE, the CDMA RAN (e.g., the MSC 30) may then send to the IWS a page request, and the IWS may in turn signal to the MME 16. The MME may then signal to the UE's serving LTE base station to trigger the LTE base station to transmit a CSFB page to the UE over the RRC connection, which may cause the UE to transmit to its serving LTE base station a CSFB extended service request (ESR) message. The LTE base station may then forward the ESR message to the MME, which in turn may pass the ESR message to the CDMA RAN. Thereafter, the CDMA RAN (e.g., BTS 26, as directed by the MSC 30) may assign a CDMA traffic channel to the UE and transmit to the UE (via the LTE RAN) a traffic channel assignment message for the assigned channel, and the UE may then leave service of the LTE RAN and transition to engage in the call via the CDMA RAN on the assigned traffic channel. Likewise, when the UE has a call to originate, the UE may send an ESR message to its serving LTE base station, and similar CDMA call setup signaling via the LTE RAN may then occur.

In SRLTE mode, on the other hand, the UE may register with the CDMA RAN directly over the CDMA air interface via BTS 26 rather than via the LTE RAN. In particular, the UE may detect a pilot signal broadcast by BTS 26 and responsively transmit a registration request message to the BTS, which the BTS may then forward (perhaps via the BSC 28) to the MSC 30. The MSC may then engage in signaling with a home location register (not shown) to register the UE as being served by the MSC, so that calls to the UE can be connected to the UE via the MSC. Once the UE is registered with the CDMA RAN, the UE may then idle within coverage of the LTE RAN for data service, but may engage in call setup signaling directly over the CDMA air interface as discussed above, such as by periodically tuning away to search for page messages from the CDMA RAN (for a UE-terminated call) and responding to such a page message via the CDMA air interface, or by moving over to the CDMA RAN to originate a voice call.

Thus, in SRLTE mode, when the UE seeks to originate a voice call, the UE may tune away from the LTE RAN to the CDMA RAN and transmit directly via the CDMA air interface to a CDMA base station a call origination message, and the CDMA RAN may then set up and serve the UE with the call via the CDMA air interface. And likewise, when the CDMA RAN has an incoming call to connect to the UE, the CDMA RAN may transmit a page message to the UE via the CDMA air interface, which the UE may detect and respond to at one of the UE's periodic tune-aways from the LTE RAN to the CDMA RAN, and the CDMA RAN may then likewise set up and serve the UE with the call via the CDMA air interface. In either case, for the period of time during which the UE is tuned away (e.g., five seconds), ongoing data communications between the UE and the UE's serving LTE base station may be interrupted.

In line with the discussion above, when the UE is operating in SRLTE mode and is a type of device that is configured to provide at least one other device with connectivity to the UE's serving LTE base station, an interruption of communications over the LTE air interface with the LTE base station may in turn impact communications between each other device and the LTE base station via the UE. Consequently, it would be beneficial for a UE of that type to avoid operation in SRLTE mode, and to instead operate in CSFB mode in which the UE does not tune away and interrupt communications in this manner.

Accordingly, as noted above, the present disclosure provides for dynamically controlling a UE's mode of operation in a hybrid system based on a consideration of the extent to which the UE provides connectivity between at least one other device and the UE's serving base station. In particular, the UE, the UE's serving base station, and/or another entity will determine the extent to which the UE provides such connectivity and then use that determination as a basis for deciding whether to cause the UE to operate in CSFB mode or rather to operate in SRLTE mode.

To facilitate this process in practice, the UE, base station, or other entity could be programmed with logic executable to determine the extent to which the UE provides connectivity for at least one other device, and, based on that determined extent, to cause the UE to operate in CSFB mode or rather to operate in SRLTE mode. For instance, the UE or base station could refer to the data discussed above that specifies the extent to which the UE provides such connectivity and refer to this data to determine the extent. Further, the UE or base station could be programmed with mapping data that correlates each of the two modes of operation with a respective particular extent to which the UE provides such connectivity (e.g., a respective particular quantity of other devices for which the UE is currently providing such connectivity).

Thus, the UE or base station could refer to their most-recent data on the extent to which the UE provides such connectivity for at least one other device and could then refer to the mapping data so as to determine whether to cause the UE to operate in CSFB mode or rather to operate in SRLTE mode. If the UE does this, then the UE can proceed to set itself to operate in either CSFB mode or SRLTE mode. Whereas, if the base station does this, then the base station can transmit to the UE a control signal defining a directive interpretable by the UE to cause the UE to set itself to operate in CSFB mode or rather to operate in SRLTE mode and, as such, the UE can receive the directive and responsively set itself to operate in whichever of the two modes the directive indicates. For instance, the base station could send such a directive to the UE as or in an RRC connection reconfiguration message, a System Information Block #2 (SIB2) message, and/or a System Information Block #3 (SIB3) message.

As discussed above, the extent to which the UE provides connectivity for at least one other device could be a question of whether or not the UE is a type of UE that is configured to provide such connectivity, regardless of whether the UE is currently providing such connectivity. In this case, if the UE or base station determines that the UE is the type of device that is configured in this way (e.g., that the UE is a relay-UE such as UE 40, or a hotspot UE such as UE 42), the UE or base station may responsively then cause the UE to operate in CSFB mode, whereas if the UE or base station determines that the UE is not the type of device that is configured in this way (e.g., that the UE is an endpoint UE such as UE 38), the UE or base station may responsively then cause the UE to instead operate in SRLTE mode.

Additionally or alternatively, the extent at issue could be a question of whether the UE is currently providing such connectivity. In this case, if the UE or base station determines that the UE is currently providing such connectivity for to at least one other device, the UE or base station may responsively then cause the UE to operate in CSFB mode, whereas if the UE or base station determines that the UE is not currently providing such connectivity, the UE or base station may responsively then cause the UE to instead operate in SRLTE mode.

Furthermore, the extent could more specifically be a question of how many other devices the UE is currently providing with such connectivity. In this case, if the UE or base station determines that the UE is currently providing such connectivity for more than a threshold quantity of other devices (e.g., to more than one other device), the UE or base station may responsively then cause the UE to operate in CSFB mode, whereas if the UE or base station determines that the UE is currently providing such connectivity for less than the threshold quantity of other devices (e.g., to one device or no devices), the UE or base station may responsively then cause the UE to instead operate in SRLTE mode.

Moreover, the act of causing the UE to operate in either CSFB mode or SRLTE mode may occur in various ways. By way of example, the UE may be operating in one of the two modes by default, and thus the act of causing the UE to operate in either CSFB mode or SRLTE mode may involve causing the UE to switch to operate in the other, non-default mode (e.g., switch from CSFB mode to SRLTE mode, or vice versa). For instance, if the UE is currently operating in CSFB mode, the act of causing the UE to operate in SRLTE mode may involve causing the UE to (i) tune to the CDMA RAN and register with the CDMA RAN directly over the CDMA air interface so the MSC would then have a record indicating that the UE is being served directly by the CDMA RAN and (ii) set itself to tune away periodically to check for page messages. Alternatively, if the UE is currently operating in SRLTE mode, the act of causing the UE to operate in CSFB mode may involve causing the UE to (i) register for CSFB service with the CDMA RAN via the LTE RAN so the MSC would then have a record indicating that the UE is being served via the LTE RAN and (ii) set itself to not tune away periodically to check for page messages.

As another example, when the UE is operating in one of the two modes by default, the act of causing the UE to operate in either CSFB mode or SRLTE mode may involve causing the UE to continue operating in the default mode. For instance, the UE or base station may take none of the mode-switching actions noted above so that the UE remains operating in the default mode. And as yet another example, the UE may be operating in neither of the two modes by default, and thus the act of causing the UE to operate in either CSFB mode or SRLTE mode may involve either causing the UE to take the above-noted actions for operating in CSFB mode or causing the UE to take the above-noted actions for operating in SRLTE mode.

Figure 2:
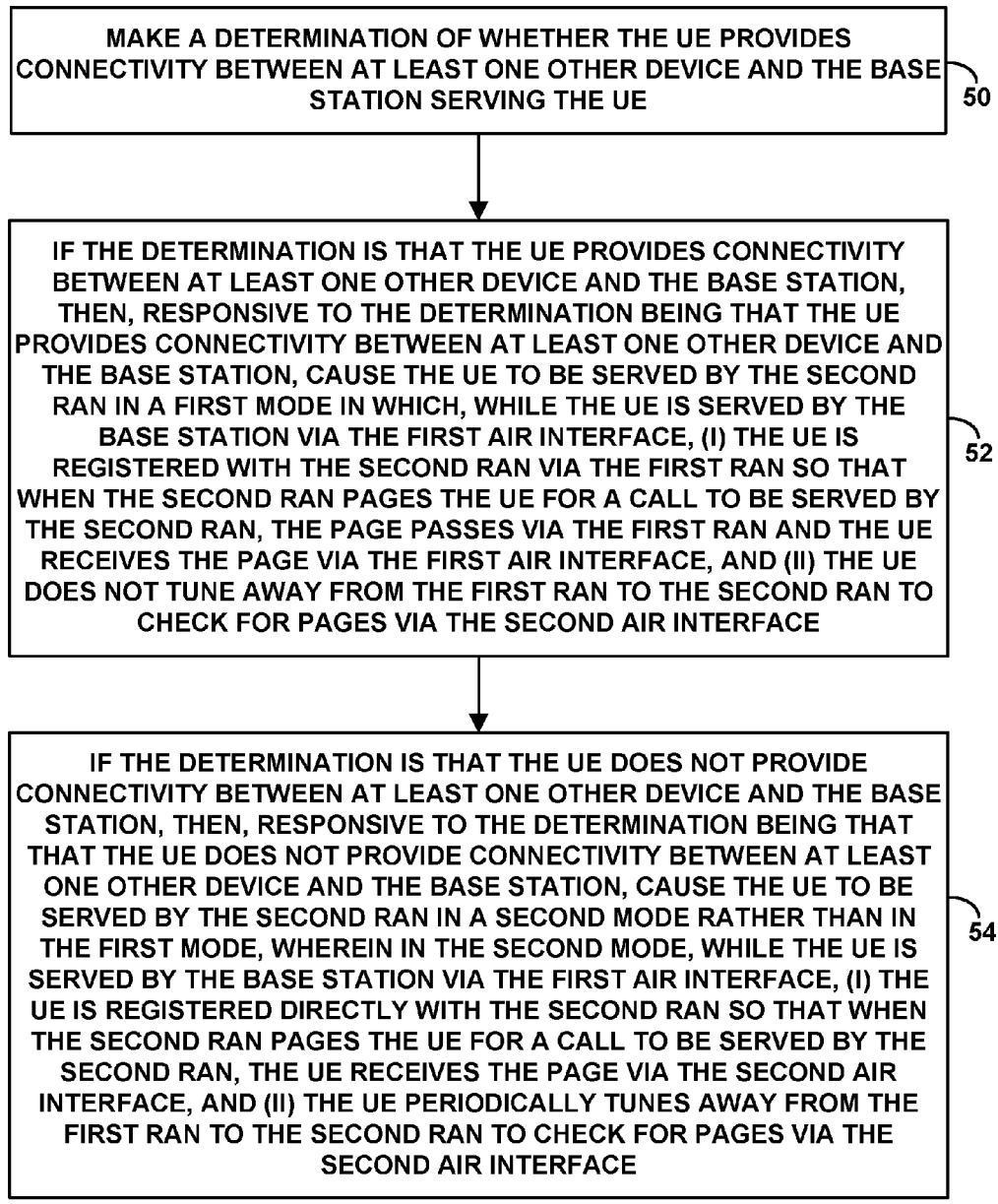
FIG. 2 is a flow chart depicting example operations that can be carried out in accordance with the present disclosure.

FIG. 2 is next a flow chart depicting operations of a representative method for controlling how a UE served by a base station of a first RAN is concurrently served by a second RAN, where the first RAN is interconnected with the second RAN, and where the first RAN provides a first air interface (e.g., an LTE air interface) and the second RAN provides a second air interface (e.g., a CDMA air interface).

As shown in FIG. 2, at block 50, the method includes making a determination of whether the UE provides connectivity between at least one other device and the base station. The method further includes, at block 52, if the determination is that the UE provides connectivity between at least one other device and the base station, then, responsive to the determination being that the UE provides connectivity between at least one other device and the base station, causing the UE to be served by the second RAN in a first mode in which, while the UE is served by the base station via the first air interface, (i) the UE is registered with the second RAN via the first RAN so that when the second RAN pages the UE for a call to be served by the second RAN, the page passes via the first RAN and the UE receives the page via the first air interface, and (ii) the UE does not tune away from the first RAN to the second RAN to check for pages via the second air interface.

And the method further includes, at block 54, if the determination is that the UE does not provide connectivity between at least one other device and the base station, then, responsive to the determination being that that the UE does not provide connectivity between at least one other device and the base station, causing the UE to be served by the second RAN in a second mode rather than in the first mode, wherein in the second mode, while the UE is served by the base station via the first air interface, (i) the UE is registered directly with the second RAN so that when the second RAN pages the UE for a call to be served by the second RAN, the UE receives the page via the second air interface, and (ii) the UE periodically tunes away from the first RAN to the second RAN to check for pages via the second air interface.

In line with the discussion above, this method could be carried out by the UE itself, by the base station, and/or by another entity. Further in line with the discussion above, the act of determining the extent to which the UE provides connectivity between at least one other device and the base station could involve determining whether the UE is a type of device that is configured to provide connectivity between at least one other device and the base station (e.g., whether the UE is a relay-UE or a hotspot UE), and/or could involve determining whether the UE is currently providing such connectivity. Additionally or alternatively, for a UE that provides such connectivity between the base station and a quantity of other devices, the mode in which the UE, the base station, or another entity causes the UE to operate could be based on the quantity.

Figure 3:
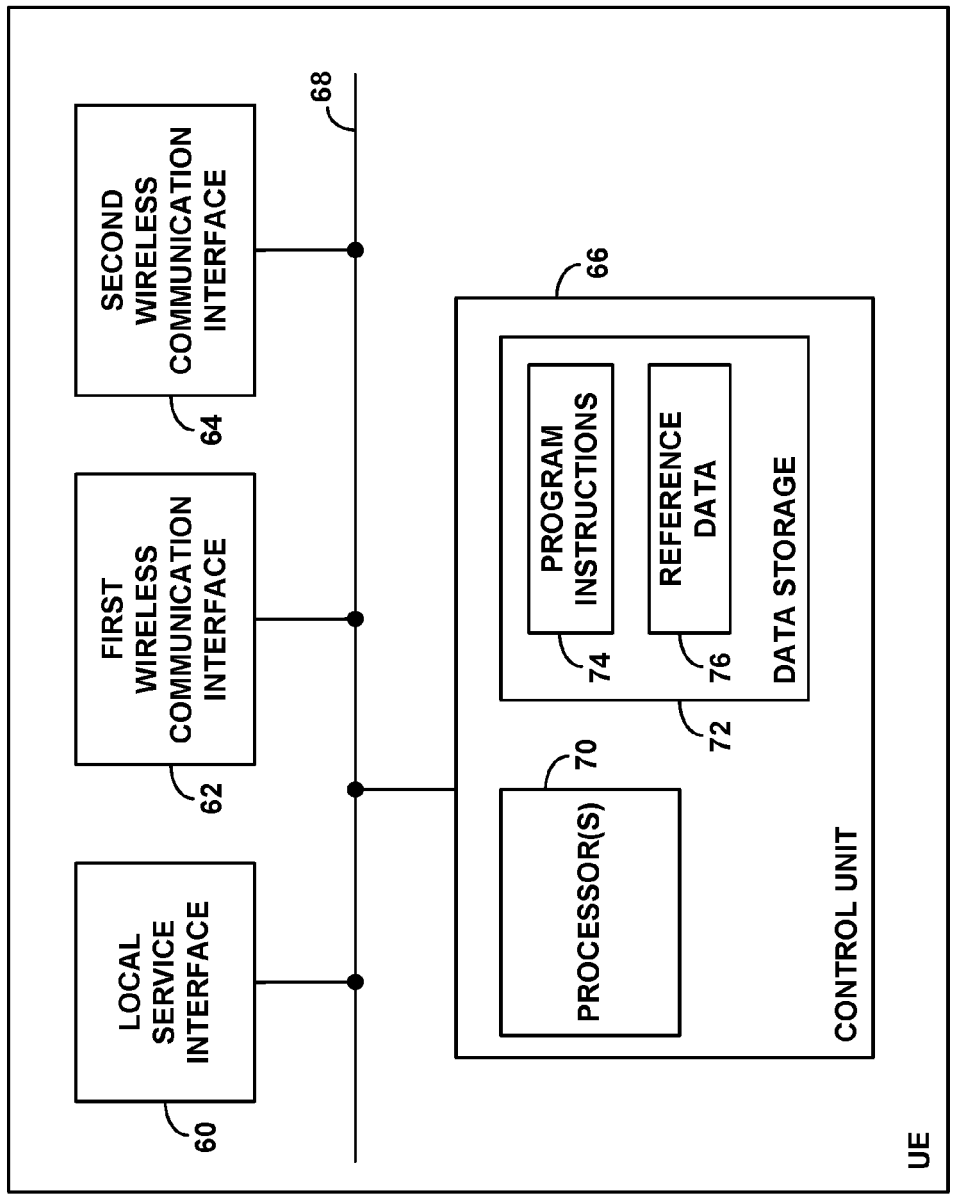
FIG. 3 is a simplified block diagram of an example UE operable in accordance with the present disclosure.

FIG. 3 is next a simplified block diagram of a representative UE showing some of the components that may be included in such a device. In particular, the representative UE is a hybrid telephony device that is configured to dynamically control whether the UE should operate in the first mode discussed above or rather in the second mode discussed above. Further, the representative UE is configured to provide connectivity between at least one other device and the UE's serving base station. For instance, such a UE may be a relay-UE or a hotspot UE.

As shown in FIG. 3, the representative UE includes a first wireless communication interface (e.g., radio) 60, a second wireless communication interface (e.g., radio) 62, a local service interface 64, and a control unit 66, all of which may be communicatively linked together by a system bus, network or other connection mechanism 68.

The first wireless communication interface 60 may be configured to facilitate communication with a first RAN according to a first air interface protocol, such as LTE or another air interface protocol discussed above. Similarly, the second wireless communication interface 62 may be configured to facilitate communication with a second RAN according to a second air interface protocol, such as CDMA, GSM, or another air interface protocol discussed above. In practice, these two wireless communication interfaces could be provided in the communication device as separate chipsets or other components, or could be integrated together on a single chipset or the like, and may include separate or integrated antennas.

The local service interface 64 could then be configured to engage in communication directly or indirectly with at least one other device. For example, the local service interface could include a local network interface (e.g., an Ethernet module) or other interface through which the UE could be networked or otherwise communicatively linked with a small cell base station that in turn serves at least one other device, and/or through which the UE could be communicatively linked more directly with at least one other device. Alternatively, the local service interface could be integrated as a module within the small cell base station, or otherwise arranged to be coupled with the small cell base station.

Further, the local service interface could provide for wired and/or wireless communication with the at least one other device. For instance, the local service interface could include a wireless communication interface that operates to communicate with at least one other device over the same air interface protocol used by the first wireless communication interface 60 or over a different air interface protocol. By way of example, the first wireless communication interface 60 could communicate with the serving base station according to LTE, and the local service interface 64 could communicate with other devices using LTE or using WiFi. Alternatively, the local service interface could be configured for connection with a wired link such as an Ethernet connection or other cable connection with at least one other device.

With these interfaces, the UE could operate to be served by, and thus communicate data to and from, its serving base station on the one hand, and communicate data to and from at least one other device on the other hand. Thus, the UE could function as an intermediary providing connectivity between the at least one other device and the UE's serving base station.

The control unit 66 could be configured to carry out various operations described herein, such as the operations discussed with respect to FIG. 2. The control unit may take various forms, including various combinations of hardware, firmware, and software for instance. By way of example, the control unit could comprise at least one processor 70, such as one or more general-purpose processors (e.g., microprocessors) and/or one or more special-purpose processors (e.g., application-specific integrated circuits). The control unit could also comprise one or more non-transitory data storage elements (e.g., magnetic, optical, and/or flash storage), such as data storage 72. The data storage could then hold or be encoded with program instructions 74 and reference data 76. The program instructions 74 could be executable by the processor(s) 70 to carry out various operations described herein. And reference data 76 could include various data to facilitate carrying out the operations, such as any of the data described above that indicates the extent to which the UE provides connectivity between its serving base station and at least one other device, and mapping data that correlates each of the UE's modes of operation with a respective particular extent to which the UE provides such connectivity, as noted above.

Exemplary embodiments have been described above. Those skilled in the art will understand, however, that changes and modifications may be made to these embodiments without departing from the true scope and spirit of the invention.

What is claimed is:

1. In a communication system in which a first radio access network (RAN) provides a first air interface and a second RAN provides a second air interface, and in which the first RAN is interconnected with the second RAN, a method for controlling how a user equipment device (UE) served by a base station of the first RAN is concurrently served by the second RAN, the method comprising:

making a determination of whether the UE provides connectivity between at least one other device and the base station;

if the determination is that the UE provides connectivity between at least one other device and the base station, then, responsive to the determination being that the UE provides connectivity between at least one other device and the base station, causing the UE to be served by the second RAN in a first mode in which, while the UE is served by the base station via the first air interface, (i) the UE is registered with the second RAN via the first RAN so that when the second RAN pages the UE for a call to be served by the second RAN, the page passes via the first RAN and the UE receives the page via the first air interface, and (ii) the UE does not tune away from the first RAN to the second RAN to check for pages via the second air interface; and if the determination is that the UE does not provide connectivity between at least one other device and the base station, then, responsive to the determination being that that the UE does not provide connectivity between at least one other device and the base station, causing the UE to be served by the second RAN in a second mode rather than in the first mode, wherein in the second mode, while the UE is served by the base station via the first air interface, (i) the UE is registered directly with the second RAN so that when the second RAN pages the UE for a call to be served by the second RAN, the UE receives the page via the second air interface, and (ii) the UE periodically tunes away from the first RAN to the second RAN to check for pages via the second air interface.

2. The method of claim 1, carried out by the UE.

3. The method of claim 1, carried out by the base station, wherein causing the UE to be served by the second RAN in the first mode comprises transmitting, from the base station to the UE, a control signal directing the UE to operate in the first mode, and wherein causing the UE to be served by the second RAN in the second mode rather than in the first mode comprises transmitting, from the base station to the UE, a control signal directing the UE to operate in the second mode.

4. The method of claim 1, wherein making the determination of whether the UE provides connectivity between at least one other device and the base station comprises making a determination of whether the UE is currently providing connectivity between at least one other device and the base station, wherein causing the UE to be served by the second RAN in the first mode is further responsive to the determination being that the UE is currently providing connectivity between at least one other device and the base station, and wherein causing the UE to be served by the second RAN in the second mode rather than in the first mode is further responsive to the determination being that the UE is not currently providing connectivity between at least one other device and the base station.

5. The method of claim 1, wherein making the determination of whether the UE provides connectivity between at least one other device and the base station comprises making a determination of whether the UE is a type of device configured to provide connectivity between at least one other device and the base station, wherein causing the UE to be served by the second RAN in the first mode is further responsive to the determination being that the UE is the type of device configured to provide connectivity between at least one other device and the base station, and wherein causing the UE to be served by the second RAN in the second mode rather than in the first mode is further responsive to the determination being that the UE is not the type of device configured to provide connectivity between at least one other device and the base station.

6. The method of claim 5, wherein the UE is provisioned with data that specifies whether the UE is the type of device configured to provide connectivity between at least one other device and the base station, and wherein making the determination of whether the UE provides connectivity between at least one other device and the base station comprises referring to the data to determine whether the UE is the type of device configured to provide connectivity between at least one other device and the base station.

7. The method of claim 5, wherein making the determination of whether the UE is the type of device configured to provide connectivity between at least one other device and the base station comprises making a determination of whether the UE is a hotspot UE configured to provide connectivity between at least one other device and the base station.

8. The method of claim 5, wherein the base station is a first base station, wherein making the determination of whether the UE is the type of device configured to provide connectivity between at least one other device and the base station comprises making a determination of whether the UE is a relay-UE configured to provide a second base station with wireless backhaul connectivity to the first base station, and wherein the second base station is configured to serve the at least one other device.

9. A method for controlling how a user equipment device (UE) served by a base station of a first radio access network (RAN) is concurrently served by a second RAN, wherein the first RAN is configured to provide a first air interface, wherein the second RAN is configured to provide a second air interface, wherein the first RAN is interconnected with the second RAN, and wherein the UE has two mutually exclusive modes of operation in which the UE can be served by the second RAN while the UE is concurrently being served by the first RAN, including (i) a first mode of operation in which the UE is registered with the second RAN via the first RAN and is thus set to receive pages from the second RAN via the first RAN and the first air interface, and the UE does not tune away from the first RAN to the second RAN to check for pages via the second air interface and (ii) a second mode of operation in which the UE is registered directly with the second RAN and is thus set to receive pages from the second RAN via the second air interface, and the UE tunes away periodically from the first RAN to the second RAN to check for pages via the second air interface, the method comprising:
 the UE making a determination of whether the UE provides connectivity between at least one other device and the base station;
 based on the determination of whether the UE provides connectivity between at least one other device and the base station, the UE making a decision whether to operate in the first mode or instead to operate in the second mode; and
 the UE operating in accordance with the decision.

10. The method of claim 9, wherein making the determination of whether the UE provides connectivity between at least one other device and the base station comprises making a determination of whether the UE is currently providing connectivity between at least one other device and the base station, and wherein making the decision whether to operate in the first mode or instead to operate in the second mode comprises:
 if the determination is that the UE is currently providing connectivity between at least one other device and the base station, then, responsive to the determination being that the UE is currently providing connectivity between at least one other device and the base station, making a decision to operate in the first mode; and
 if the determination is that the UE is not currently providing connectivity between at least one other device and the base station, then, responsive to the determination being that the UE is not currently providing connectivity between at least one other device and the base station, making a decision to operate in the second mode.

11. The method of claim 9, wherein making the determination of whether the UE provides connectivity between at least one other device and the base station comprises making a determination of whether the UE is a type of device configured to provide connectivity between at least one other device and the base station, and wherein making the decision whether to operate in the first mode or instead to operate in the second mode comprises:
 if the determination is that the UE is the type of device configured to provide connectivity between at least one other device and the base station, then, responsive to the determination being that the UE is the type of device configured to provide connectivity between at least one other device and the base station, making a decision to operate in the first mode; and
 if the determination is that the UE is not the type of device configured to provide connectivity between at least one other device and the base station, then, responsive to the determination being that the UE is not the type of device configured to provide connectivity between at least one other device and the base station, making a decision to operate in the second mode.

12. The method of claim 11, wherein the base station is a first base station, wherein making the determination of whether the UE is the type of device configured to provide connectivity between at least one other device and the base station comprises making a determination of whether the UE is a relay-UE configured to provide a second base station with wireless backhaul connectivity to the first base station, and wherein the second base station is configured to serve the at least one other device.

13. The method of claim 9, wherein the UE is configured to provide connectivity between at least one other device and the base station, and wherein making the decision, based on the determination of whether the UE provides connectivity between at least one other device and the base station, whether to operate in the first mode or instead to operate in the second mode comprises:
 making a determination of a quantity of other devices the UE is currently providing with connectivity to the base station;
 if the determination is that the quantity of other devices is greater than one, then, responsive to the determination being that the quantity of other devices is greater than one, making a decision to operate in the first mode; and if the determination is that the quantity of other devices is less than or equal to one, then, responsive to the determination being that the quantity of other devices is less than or equal to one, making a decision to operate in the second mode.

14. The method of claim 9, further comprising:
before making the determination of whether the UE provides connectivity between at least one other device and the base station, the UE operating in the first mode,
wherein making the decision to operate in the second mode comprises making a decision to switch from operating in the first mode to instead operating in the second mode, and wherein operating in accordance with the decision comprises switching from operating in the first mode to instead operating in the second mode.

15. A user equipment device (UE) with dynamic operating mode, the UE comprising:
a first radio configured for the UE to be served by a first radio access network (RAN), wherein the first RAN provides a first air interface, and wherein the first RAN is interconnected with a second RAN;
a second radio configured for the UE to be served by the second RAN, wherein the second RAN provides a second air interface; and
a control unit configured for controlling how the UE, when served by a base station of the first RAN, is concurrently served by the second RAN, wherein the controlling comprises: (i) making a determination of whether the UE provides connectivity between at least one other device and the base station, (ii) if the determination is that the UE provides connectivity between at least one other device and the base station, then, responsive to the determination being that the UE provides connectivity between at least one other device and the base station, causing the UE to be served by the second RAN in a first mode, and (iii) if the determination is that the UE does not provide connectivity between at least one other device and the base station, then, responsive to the determination being that the UE does not provide connectivity between at least one other device and the base station, causing the UE to be served by the second RAN in a second mode rather than in the first mode,
wherein in the first mode, the UE is registered with the second RAN via the first RAN and is thus set to receive pages from the second RAN via the first RAN and the first air interface, and the UE does not tune away from the first RAN to the second RAN to check for pages via the second air interface, and
wherein in the second mode, the UE is registered directly with the second RAN and is thus set to receive pages from the second RAN via the second air interface, and the UE tunes away periodically from the first RAN to the second RAN to check for pages via the second air interface.

16. The UE of claim 15, wherein the UE is provisioned with data that specifies whether the UE is a type of device configured to provide connectivity between at least one other device and the base station, and wherein making the determination of whether the UE provides connectivity between at least one other device and the base station comprises referring to the data to determine whether the UE is the type of device configured to provide connectivity between at least one other device and the base station.

17. The UE of claim 15, wherein the first RAN provides the first air interface according to a first air interface protocol, and wherein the UE is configured to provide connectivity for the at least one other device according to the first air interface protocol.

18. The UE of claim 15, wherein the first RAN provides the first air interface according to a first air interface protocol, and wherein the UE is configured to provide connectivity for the at least one other device according to a second air interface protocol different from the first air interface protocol.

19. The UE of claim 15, wherein the UE is configured to provide connectivity for the at least one other device, wherein making the determination of whether the UE provides connectivity between at least one other device and the base station comprises determining a quantity of other devices the UE is currently providing with connectivity to the base station, wherein causing the UE to be served by the second RAN in the first mode is further responsive to the determined quantity of other devices being greater than one, and wherein causing the UE to be served by the second RAN in the second mode is further responsive to the determined quantity of other devices being less than or equal to one.

20. The UE of claim 15, wherein the first mode is a Circuit-Switched Fallback (CSFB) mode, and wherein the second mode is a Single Radio Long Term Evolution (SR-LTE) mode.

* * * * *